Jan. 16, 1962   E. W. LENZ ET AL   3,016,968
REMOTELY ACTUATED TRUNK LOCK ARRANGEMENT FOR A MOTOR VEHICLE
Filed April 7, 1959
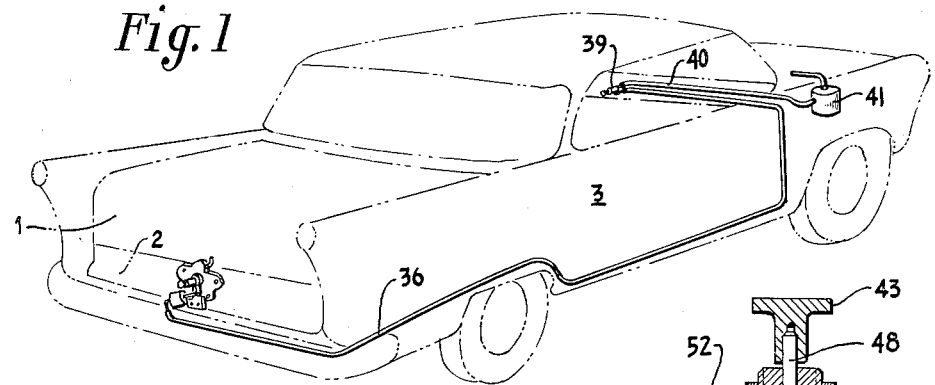
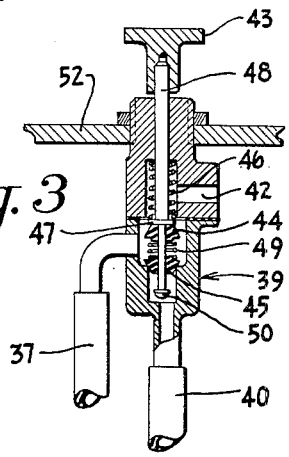
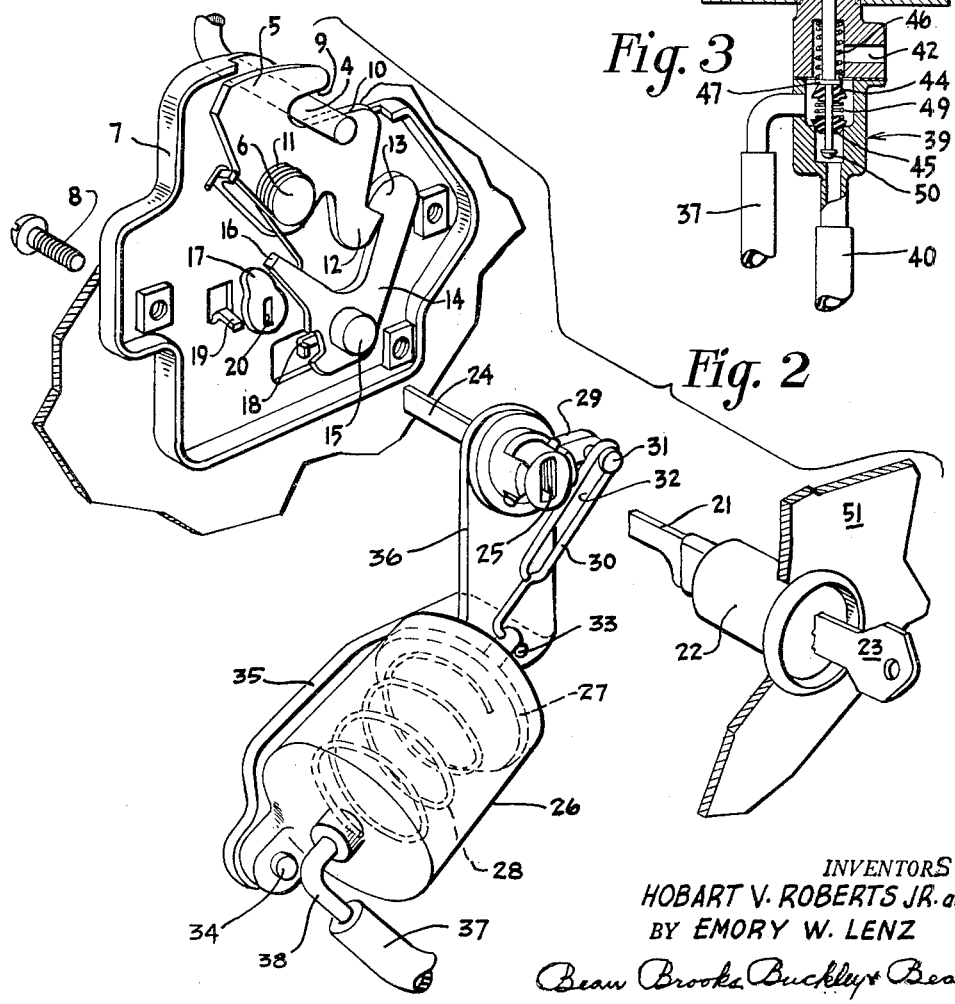
INVENTORS
HOBART V. ROBERTS JR. and
BY EMORY W. LENZ
Bean Brooks Buckley & Bean
ATTORNEYS

United States Patent Office 3,016,968
Patented Jan. 16, 1962

---

3,016,968
REMOTELY ACTUATED TRUNK LOCK ARRANGEMENT FOR A MOTOR VEHICLE
Emory W. Lenz, Buffalo, and Hobart V. Roberts, Jr., Elma, N.Y., assignors to Trico Products Corporation, Buffalo, N.Y.
Filed Apr. 7, 1959, Ser. No. 804,615
9 Claims. (Cl. 180—82)

This invention relates to a motor vehicle trunk and more particularly to a remotely controlled securement for its lid, sometimes referred to as the rear deck of the vehicle, the object of the invention being to make the trunk readily accessible to an occupant of the front seat for conveniently unlocking the trunk when desired, for example, when passing through custom inspection at a port of entry.

Further, the invention resides in a trunk locking system by which the trunk may be readily unlocked, either by key or by power, through a simple combining mechanism that facilitates installation and insures a practical working embodiment.

Again, it is an object of this invention to add to the key type of trunk lock a power supplement or adaptor that operates from a suitable source of suction, or other power, and is within reach of the car occupant, the power supplement being in the form of a small motor that is so combined as to avoid imposing upon the unlocking key any portion of the motor load when the key is used.

These and other objects will manifest themselves as this description progresses, reference being made therein to the accompanying drawing wherein FIG. 1 is a rear perspective view of an automobile equipped with the present invention;

FIG. 2 is an exploded view of the combined lock mechanism; and

FIG. 3 is a longitudinal sectional view through the power control for the trunk.

Referring more particularly to the drawing, the numeral 1 designates the rear deck or lid for the trunk 2 located in the rear portion of the automobile body 3. Any suitable design of trunk lock may be used. In the illustrated embodiment, the trunk lock comprises a keeper 4, fixed to the lid 1, and a latch plate 5 pivoted at 6 in a casing 7 which in turn is secured to the trunk wall by anchor bolts, such as 8. The latch plate has a keeper-receiving recess 9 and an extended edge 10 designed to be struck by the keeper, when closing the lid, to rock the latch plate against the urge of its coil spring 11 which latter returns the plate thereover for disposing the keeper in its recess. The latch plate 5 is also formed with a lock shoulder 12 for being engaged by a cooperating catch 13 on one arm of a locking bellcrank lever 14, the latter being rockable on a pivot 15 also against the urge of said spring 11. The opposite ends of this coil-type spring bear respectively upon the latch plate 5 and the other arm 16 of the locking lever 14 to function in this dual capacity. A key actuated rocker or actuator 17 is pivotally mounted in proximity to the arm 16 for rocking the latter clockwise to disengage the catch 13 and thereby release the latch plate for unlocking the trunk lid 1. Positioning lugs 18 and 19 may be formed from the casing to hold the locking lever 14 and the rocker 17 in proper relation to each other. The rocker 17 is formed with a socket 20 to detachably receive the shank 21 of a cylinder lock 22 for being rocked thereby when freed by the key 23. The lock structure just described in detail is at present in use in the art.

According to the present invention, a power unit is coupled to the rocker 17 and its control is extended to the driver's seat by which the trunk may be unlocked without the driver alighting from the vehicle. To this end, and as exemplified herein, an interlocking adaptor unit or insert is interposed between the rocker and the shank 21, such insert having a transmission shaft with an extension shank 24 at one end to detachably engage in the socket 20, and at its opposite end a shank receiving socket 25 for receiving the lock-cylinder shank 21. When thus assembled, the elongated composite shaft 21, 25, 24 may be rocked by the key 23 to manually actuate the bellcrank and thereby unlock the trunk lid.

To power unlock the trunk, a small motor is employed to rock the adaptor insert and its coupled rocker 17. This power unit may be electrically operated, but herein it is depicted as being suction actuated, the same comprising a motor chamber 26 and a fluid displacing member in the form of a piston 27 to be returned to its normal position by a spring 28. A crank arm 29 is fixed on the adaptor shaft 24 and connected by a link 30 to the motor piston 27 through a play connection as provided by the crank pin 31 slidably working in the slot 32 of the link. The link has pivotal connection with the piston at 33, and the power unit may be conveniently mounted by a pivot 34 on a bracket 35 which has an upstanding arm 36 to give journal-bearing support for the adaptor.

A suction hose 37 is fitted over a nipple 38 on the motor chamber 26 and leads forwardly to a control valve 39 located in a position to make it accessible to the driver of the vehicle. A conduit 40 connects the valve to a power source, such as the intake manifold of the vehicle engine or to a connected storage tank 41. Normally, the control valve 39 has an open atmospheric vent 42 to the motor chamber 26. The crank pin 31 will therefore rest in the outer end of the slot 32. For power unlocking the trunk, a pull on the knob 43 will initially seat the valving element 44 to close the vent and then unseat the valving element 45 to establish communication between the power unit and the power source whereupon the piston 27 will move against its spring urge and exert a pull on the link 30 and the crank arm 29 to rock the rocker 17 and unlock the trunk lid. Upon releasing the knob 43, its spring 46, which rests upon a shoulder 47 on the valve stem 48, will depress the valving element 45 to close off the suction conduit 40 and revent the motor chamber 26 to the atmosphere, this being accomplished by the predominant spring 46 relative to the lighter spring 49 which latter is interposed between the valving elements 44 and 45 that are slidable on the valve stem 48 between the shoulders 47 and 50.

From the foregoing, it will be observed that the motorist may unlock the trunk from his seat by simply pulling on the knob 43 and thereby free the trunk lid for being manually lifted for inspection or other reason. Releasing the knob 43 will permit the lid being manually closed whereupon the shoulders 12 and 13 will interlock to secure the trunk lid closed. The trunk may be unlocked easily by the key 23 because key actuation of the composite shaft unit 17, 21, 24 will be independent of the motor unit at which time the crank pin merely idles in the link slot 32. The adaptor insert 24, 25, 29 and its power unit may be readily installed in the trunk lock by simply interlocking the opposite ends of the shaft 24, 25, with the rocker 17 and the lock-cylinder shank 21 which latter is suitably mounted in the car body 51. To complete the installation requires only the mounting of the control valve 39 on the instrument panel 52 of the vehicle and establishing the hose connections 37, 40 with the source of power.

The foregoing description has been given in detail for clearness and not by way of limitation since the inventive concept is capable of assuming other physical embodiments without departing from the spirit of the invention and the scope of the appended claims.

What is claimed is:

1. A motor vehicle having a trunk with a lid adapted to be secured closed by a lock provided with a key unlocking part, comprising in combination therewith, a power adaptor including a transmission shaft inserted between said lock and said key unlocking part and motor means for moving said transmission shaft, and means for actuating said motor means from a remote position, to thereby either permit said lock to be selectively actuated by a key acting in conjunction with said key unlocking part or by the action of said motor means.

2. A motor vehicle having a trunk with a lid secured closed by a lock provided with a key unlocking part, comprising in combination therewith, a power adaptor including a motor adapted to be actuated from a remote position and having a transmission shaft inserted between the lock and said unlocking part and interlocking therewith, and means connecting the motor to the transmission shaft for power actuation but operable to preclude interference of the power adaptor with the actuation of said lock by the key.

3. A motor vehicle having a trunk with a lid secured closed by a lock provided with a lock releasing rocker, and a key unlocking part, comprising in combination therewith, a power adaptor insert interposed between the lock and said unlocking part and including shaft means having a part at one end detachably interlocking with said lock releasing rocker and a coupling interlock at its opposite end detachably coupled to the key unlocking part, and motor means operatively coupled to said shaft means for selectively actuating said lock.

4. A motor vehicle having a trunk with a lid secured closed by a lock provided with a separable manual unlocking part, comprising in combination therewith, a power adaptor insert including motor means and having opposed couplings inserted between and operatively connecting the lock and said unlocking part, and means selectively operable for either manually unlocking of said lock by the use of said manual unlocking part or by actuation of said motor means.

5. A motor vehicle having a source of power, a trunk having a lid and a spring actuated latch therefor including a rockable shaft and a locking member releasable by the shaft to unlock the lid, a power unit connected to the source and including a motor operable to rock the shaft to unlock the latch against its spring, a crank arm fixed on the shaft and having a play connection with the motor to permit locking the lid upon closing the latter, and remotely disposed means for the motor to power unlock the trunk.

6. A motor vehicle having a source of power and a trunk having a lid and a spring actuated lock therefor including a rockable shaft and a locking member releasable by the shaft to unlock the lid, a power unit connected to the source and including a motor connected to the source and having a play connection with the shaft to rock it, and a spring associated with the motor and operable normally to hold the connection for prompt response to motor operation while permitting independent manual rocking of the shaft.

7. A motor vehicle having a source of power and a trunk with a lid secured closed by a lock, an actuator for rendering the lock inoperative, a manually operable member connectible to said actuator for operating it, a power adaptor insert for operating the actuator, said insert being interposed between the actuator and the manually operable member and operatively connecting the two for such manual action, said insert having a transmission part for coupling the actuator thereto and a second transmission part for coupling the manually operable member thereto, and remote control means for power energizing said insert.

8. A power adaptor insert for permitting selective remote actuation of a vehicle lock having a latch mechanism and a key operated part for unlatching said latch mechanism comprising a transmission mechanism including a first portion adapted for engagement with said key operated part and a second portion adapted to engage said latch mechanism, motor means, linkage means operatively coupling said motor means to said transmission mechanism, and means for energizing said motor means for causing said motor means to actuate said transmission mechanism, said power adaptor insert thereby permitting selective unlatching of said lock by a key or by said motor means.

9. In combination in a motor vehicle a trunk lid, a latch mechanism for said trunk lid, a key actuated member for unlatching said trunk lid, a transmission mechanism in engagement with said key actuated member, said transmission mechanism being in turn in engagement with said latch mechanism, motor means mounted proximate said transmission mechanism, linkage means coupling said motor means and said transmission mechanism, and lost-motion means operatively associated with said linkage means for preventing said motor means from interfering with manual unlatching by the use of said key operated means and for preventing interference of said key operated means with unlatching by the use of said motor means.

References Cited in the file of this patent

UNITED STATES PATENTS

| | | |
|---|---|---|
| 1,555,174 | Williams | Sept. 29, 1925 |
| 2,198,862 | Chesler | Apr. 30, 1940 |
| 2,688,865 | Foster et al. | Sept. 14, 1954 |
| 2,896,990 | Garvey et al. | July 28, 1959 |